(12) United States Patent
Liekens et al.

(10) Patent No.: US 9,148,296 B2
(45) Date of Patent: Sep. 29, 2015

(54) APPLICATION MODULE AND REMOTE MANAGEMENT SERVER WITH PARAMETER DESCRIPTION MODEL

(75) Inventors: Werner Mario Liekens, Sint-Katelijne-Waver (BE); Christoph Stevens, Stekene (BE); Pascal Marie Edouard Julien Justen, Brussels (BE); Jan Coppens, Ghent (BE); Christele Bouchat, Antwerp (BE); Willem Jozef Amaat Acke, Rijmenam (BE)

(73) Assignee: Alcatel Lucent, Boulogne-Billancourt (FR)

( * ) Notice: Subject to any disclaimer, the term of this patent is extended or adjusted under 35 U.S.C. 154(b) by 1387 days.

(21) Appl. No.: 12/116,370

(22) Filed: May 7, 2008

(65) Prior Publication Data

US 2008/0282268 A1    Nov. 13, 2008

(30) Foreign Application Priority Data

May 7, 2007   (EP) .................................. 07290579

(51) Int. Cl.
| | |
|---|---|
| G06F 15/177 | (2006.01) |
| G06F 9/44 | (2006.01) |
| G06F 9/46 | (2006.01) |
| H04L 12/28 | (2006.01) |
| G06F 9/54 | (2006.01) |
| H04L 12/66 | (2006.01) |
| H04L 12/24 | (2006.01) |

(52) U.S. Cl.
CPC ............ *H04L 12/2803* (2013.01); *G06F 9/547* (2013.01); *H04L 12/66* (2013.01); *H04L 41/0266* (2013.01); *H04L 41/0806* (2013.01); *H04L 41/0886* (2013.01)

(58) Field of Classification Search
CPC ...... G06F 9/547; H04L 12/2803; H04L 12/66
See application file for complete search history.

(56) References Cited

U.S. PATENT DOCUMENTS

| 7,885,273 B2 * | 2/2011 | Lee et al. ...................... 370/401 |
| 2002/0052935 A1 * | 5/2002 | Paxhia et al. ................. 709/220 |

(Continued)

FOREIGN PATENT DOCUMENTS

DE      202006006419 U1   10/2006

OTHER PUBLICATIONS

DSL-Home-Technical Working Group: "DSL Form TR-111; Applying TR-069 to remote management of home networking devices" Technical Report, (Online) Dec. 2005, pp. 1028, XP002455794.

(Continued)

*Primary Examiner* — H S Sough
*Assistant Examiner* — Kimberly Jordan
(74) *Attorney, Agent, or Firm* — Harness, Dickey & Pierce, P.L.C.

(57) ABSTRACT

A customer device is configured to allow remote installation of an application module and remote configuration from a remote management server. The application module includes a parameter model with model parameters configured for communication automatically between the remote management client residing in the customer device and the remote management server via a remote management protocol. The parameter model further includes at least one description parameter that formally describes a new model parameter forming part of the parameter model. The description parameter triggers creation of the new model parameter at the remote management server.

16 Claims, 2 Drawing Sheets

(56) References Cited

U.S. PATENT DOCUMENTS

2008/0133718 A1* 6/2008 Bouchat et al. .............. 709/220
2008/0133752 A1* 6/2008 Liekens et al. ............... 709/225

OTHER PUBLICATIONS

OMA Open Mobile Alliance: "Device Management requirements Version 1.2", Internet Article (Online) Feb. 9, 2007, pp. 1-062, XP002455795.

J. Bernstein et al, "DSL Forum TR-106: Data Model Template for TR-069 Enabled Devices", Sep. 1, 2005, Technical Report DSL Forum, pp. 1-29, XP002386137.

J. Bernstein et al, "CPE WAN Management Protocol", Apr. 1, 2004, Technical Report DSL Forum, pp. 1-109, XP002385974.

DSL Forum 2007—Christele Bouchat—DSL Home—Introduce a new attribute—Vancouver Meeting Mar. 2007.

Search Report for corresponding European Application No. 07290579.7 dated Nov. 6, 2007.

* cited by examiner

PARAMETER MODEL

| Name | Value |
|---|---|
| InternetGatewayDevice.service.FTP.url | ftp://host.dom/ |
| InternetGatewayDevice.Dynamic.Parameter.1.Name | InternetGatewayDevice.service.ftp.url |
| InternetGatewayDevice.Dynamic.Parameter.1.Type | String |
| InternetGatewayDevice.Dynamic.Parameter.1.Definition | URL designating the file or directory on an Internet host accessible using the FTP application. |
| InternetGatewayDevice.service.FTP.login | myname |
| InternetGatewayDevice.Dynamic.Parameter.2.Name | InternetGatewayDevice.service.ftp.login |
| InternetGatewayDevice.Dynamic.Parameter.2.Type | String |
| InternetGatewayDevice.Dynamic.Parameter.2.Definition | Login name used by the FTP application to access the Internet host. |
| InternetGatewayDevice.service.FTP.password | mypassword |
| InternetGatewayDevice.Dynamic.Parameter.3.Name | InternetGatewayDevice.service.ftp.password |
| InternetGatewayDevice.Dynamic.Parameter.3.Type | String |
| InternetGatewayDevice.Dynamic.Parameter.3.Definition | User name used by the FTP application to access the Internet host. |

APPLICATION MODULE AND REMOTE MANAGEMENT SERVER WITH PARAMETER DESCRIPTION MODEL

FIELD OF THE INVENTION

The present invention generally relates to remote management, i.e. installation, configuration and removal, of application or service software modules—the so called "bundles"—on customer premises equipment (CPE) from a server located anywhere in a network with connectivity to the CPE devices. The server is named the auto configuration server or remote management server throughout this patent application. Examples of CPE or customer devices are a Digital Subscriber Line (DSL) modem, a Set-Top Box (STB), a wireless terminal such as a mobile telephone, a Personal Digital Assistant (PDA), etc. More particularly, the invention relates to the learning of the parameter model that inherently forms part of a newly installed bundle or application module by the remote management server.

BACKGROUND OF THE INVENTION

Remote management systems consist of a management platform in the customer device, a remote management server in the network, and a remote management protocol for communication between a management client or agent running on the management platform in the customer device and the remote management server.

An example management platform is the OSGi (Open Service Gateway initiative) service platform, which is a Java-based service platform that runs on top of a Java Virtual Machine (JVM) inside the customer device that is remotely managed. Presence of an OSGi service platform in the customer device enables remote installation, update and/or removal of bundles, i.e. software modules or components such as for instance a File Transfer Protocol (FTP) application, from an auto configuration server anywhere in the network without disrupting the operation of the customer device. This way, installation of a software application, upgrading the software application to a new version, re-configuring the application, adding or activating new features of the application, and removal of the application from the customer device, is made possible without dispatching a technician to the customer premises and without requiring an intervention by the customer. Thanks to the management platform, the software services or applications running on a single customer device can share their capabilities with each other.

The management agent or management client serves as an interface between the bundle or software application and the remote management server, and enables the management platform in the customer device to expose manageable parameters to the remote management server.

The role of the management protocol is to provide a mechanism by which the auto-configuration server can securely read or write parameter values to configure the software in the customer device and eventually monitor the status and statistics of the customer device. An example management protocol for secure remote management of customer devices is the TR-069 protocol defined by the DSL Forum in its Technical Report TR-069, entitled "CPE WAN Management Protocol".

The TR-069 protocol is Remote Procedure Call (RPC) based, i.e. a generic message based mechanism by which the auto configuration server is able to read/write/configure parameters and parameter attributes of a software component running on a CPE device. Each parameter consists of a name-value pair. The name identifies the particular parameter and has a hierarchical structure similar to files in a directory, the different levels being separated by a "." (dot). The value of a parameter may be one of several defined data types. Each parameter further may be defined as a read-only or read-write parameter depending on whether the auto configuration server is allowed to only read the parameter or also to change the value of the parameter.

A particular example could be an HyperText Transfer Protocol (HTTP) service or application that is installed on an ADSL or VDSL modem for client-server communications. All parameters of the HTTP application constitute the parameter model of the HTTP application. An example parameter is the number or identification of the port where the HTTP application listens to. The ADSL or VDSL modem is supposed to have an OSGi platform running on top of a Java Virtual Machine. The OSGi platform enables to share the capabilities of the HTTP application with other applications, e.g. a web browser. Via a TR-069 management agent installed on top of the OSGi platform, the parameters of the HTTP application can be made visible and accessible to an auto configuration server (ACS) in the DSL network or any other TR-069 aware bundle.

To introduce new model parameters to the auto configuration server, e.g. on installation of a new bundle, the prior art teaches three possibilities.

A first possible solution to introduce a new model parameter consists in describing the parameter through standardization. Standardized model parameters are known by standard compliant auto configuration servers and consequently can be discovered and uploaded autonomously from the customer side to the server side upon installation of the new software bundle. Obviously, this first solution takes time and consensus, and is not viable for new non-standardized or proprietary model parameters.

An alternative solution for introducing new model parameters to the auto configuration server consists in upfront defining these new model parameters, e.g. in an extended markup language (XML) file, and manually uploading the created XML file on the auto configuration server. The manual intervention of an operator however is error-prone, cumbersome and expensive.

The third prior art solution consists in defining a new attribute for the remote management protocol, e.g. TR-069, which is an additional field for one or several messages enabling to convey a parameter description, e.g. an extended markup language (XML) scheme defining the new model parameter(s), from the northbound interface of the CPE device to the southbound interface of the auto configuration server. This third prior art solution has for instance been described in contribution dsl2006.873 from Christele Bouchat and Werner Liekens for DSL Forum Specification TR69v2 or WT-148, that was entitled "Introduce a New Attribute" and submitted with the DSL Forum in March 2007. Although the latter solution does no longer require manual intervention of an operator, it is disadvantageous in that it takes adaptation of the configuration management protocol. An additional attribute has to be introduced which again takes consensus and standardization. Even if standardized, the third solution poses a problem of compatibility with deployed auto configuration servers and existing software applications which do not support the additional attribute. Another drawback of the third solution is its negative impact on the performance of the remote configuration. Indeed, as a result of the additional attribute, at least two messages have to be communicated between the CPE device and the auto configuration server in order to introduce a new model parameter to the server. First, the names and values of the parameters are communicated in response to for instance the TR-069 GetParameterValues instruction. Thereafter, the attributes including the attribute that describes the new parameters are communicated in response to for instance the TR-069 GetParameterAttributes instruction.

It is an object of the present invention to disclose an application module (or bundle) and a remote management server (or ACS) that overcome the drawbacks of the above described prior art solutions. In particular, it is an objective to disclose an application module and a remote management server able to discover new non-standardized model parameters in an automated fashion that does not require adaptation of the standardized remote management protocol and which does not impact the performance of the remote management mechanism.

SUMMARY OF THE INVENTION

According to the present invention, the drawbacks of the prior art are overcome and the above defined objectives are realized by the application module defined in claim 1, having a parameter model that comprises at least one description parameter adapted to formally describe the new model parameter and to trigger automatic creation of the new model parameter at the remote management server.

Thus, according to the invention, the parameter model of a bundle features additional parameters that contain a formal description of new model parameters, e.g. the name and type of a new parameter. Since the description forms part of additional parameters, no new fields or attributes have to be defined in the remote management protocol to communicate the description of the new parameter(s) to the remote management server. The additional parameters, called description parameters throughout this patent application, will be communicated automatically from the CPE northbound interface to the ACS southbound interface in response to for instance the TR-069 GetParameterValues instruction issued by the ACS. The description parameters are further supposed to dynamically trigger the creation of the new model parameters at the remote management server. Upon recognition of a predefined name or predefined portion of the name of a description parameter by the remote management server, the remote management server for instance knows that the following information will represent the name and type of a new model parameter. The remote management server in other words automatically learns the information it needs to create the new model parameter from the accompanying description parameter(s) that is/are communicated between CPE and ACS using existing protocol attributes or fields. No standardization or manual intervention is required.

In addition to the application module or bundle defined by claim 1, the current invention relates to a remote management server or ACS as defined by claim 9, able to remotely install and configure an application module on a customer device, and thereto comprising means to automatically receive a parameter model with at least one model parameter from the application module via a remote management protocol, means to automatically receive description parameter(s) that formally describe the at least one model parameter, and means to automatically trigger creation of the at least one model parameter at the remote management server using the description parameter(s).

An optional feature of the application module according to the present invention consists in the fact that the description parameter(s) may be read-only parameter(s), as indicated by claim 2.

This way, when an audit is performed by the remote management server, it will receive all necessary information to create, parse, store and handle new model parameters, but the remote management server will not be able to change the information contained by the description parameters. As a consequence, damaging the descriptive information that enables creation of a model parameter becomes impossible.

Another optional aspect of the application module according to the present invention, defined by claim 3, is that the description parameter(s) comprise a trigger in their name to trigger automatic creation of the new model parameter(s) at the remote management server.

Indeed, a predefined parameter name, e.g. "Dynamic.parameter" or "Description.parameter", or a predefined portion of the parameter name will enable the remote management server to distinguish description parameters from model parameters when it audits the management client. Upon recognition of the predefined parameter name or the predefined name portion, the remote management server knows that the following information will include descriptive information enabling the remote management server to create a new model parameter.

Optionally, as indicated by claim 4, the presence of the word "Dynamic" in the parameter name may trigger creation of a new model parameter.

Indeed, if for instance an FTP application is installed on a CPE device, a new model parameter named "InternetGatewayDevice.Service.FTP.url" may have to be created. Thereto, the FTP application may contain in its parameter model a description parameter with the name "InternetGatewayDevice.Dynamic.Parameter.1.Name" and as value the string "InternetGatewayDevice.Service.FTP.url". Upon an audit by the remote management server, the latter shall recognize the word "Dynamic" in the name of the additional parameter and conclude therefrom that a new model parameter must be created with the name "InternetGatewayDevice.Service.FTP.url". Obviously, any other predefined name or portion of the name, or any other convention that enables the remote management server to recognize a description parameter is functionally equivalent, and the current invention is not restricted to a particular way of distinguishing description parameters from model parameters.

Another optional aspect of the present invention is that the description parameter(s) may comprise a name parameter to formally describe the name of a new model parameter. This aspect is defined in claim 5.

Additionally or alternatively, description parameter(s) may comprise a type parameter to formally describe the type of a new model parameter. This is indicated by claim 6.

Further optionally, the description parameter(s) may comprise a definition parameter to formally define a new model parameter in a human language. This option is defined by claim 7.

Thus, examples of description parameters that formally describe a new model parameter are a name parameter, a type parameter, a definition parameter. Evidently, the current invention is not restricted to a particular choice of description parameter or set of description parameters. The set of description parameters for new model parameters can have the same constitution for each new model parameter, e.g. name and type, or may have a different constitution for different new model parameters, e.g. name and type for a first new model parameter, name, type and subtype for a second new model parameter, name, type and description for a third new model parameter, etc.

Yet another optional aspect of the present invention is that the remote management protocol might be the TR-069 protocol, as defined by claim 8.

As mentioned already in the introductory part of this patent application, the DSL Forum has defined in its Technical Report TR-069 a protocol for remote management, i.e. a way of naming parameters in a hierarchically structured way, and a way of securely reading/writing these parameters from a remote location in the network through a sequence of messages. Obviously, the concept of description parameters that formally describe new model parameters and that automatically trigger the creation of such new model parameters is not limited to a particular existing or future remote management protocol. Variant management protocols whose current or future versions may be used in conjunction with the current invention are for instance the OMA-DM Open Mobile Alliance Device Management protocol for mobile customer devices or SNMP (Simple Network Management Protocol).

BRIEF DESCRIPTION OF THE DRAWINGS

FIG. 2 illustrates the parameter model 120 of the application module 114 of FIG. 1 in more detail.

DETAILED DESCRIPTION OF EMBODIMENT(S)

Figure 1:
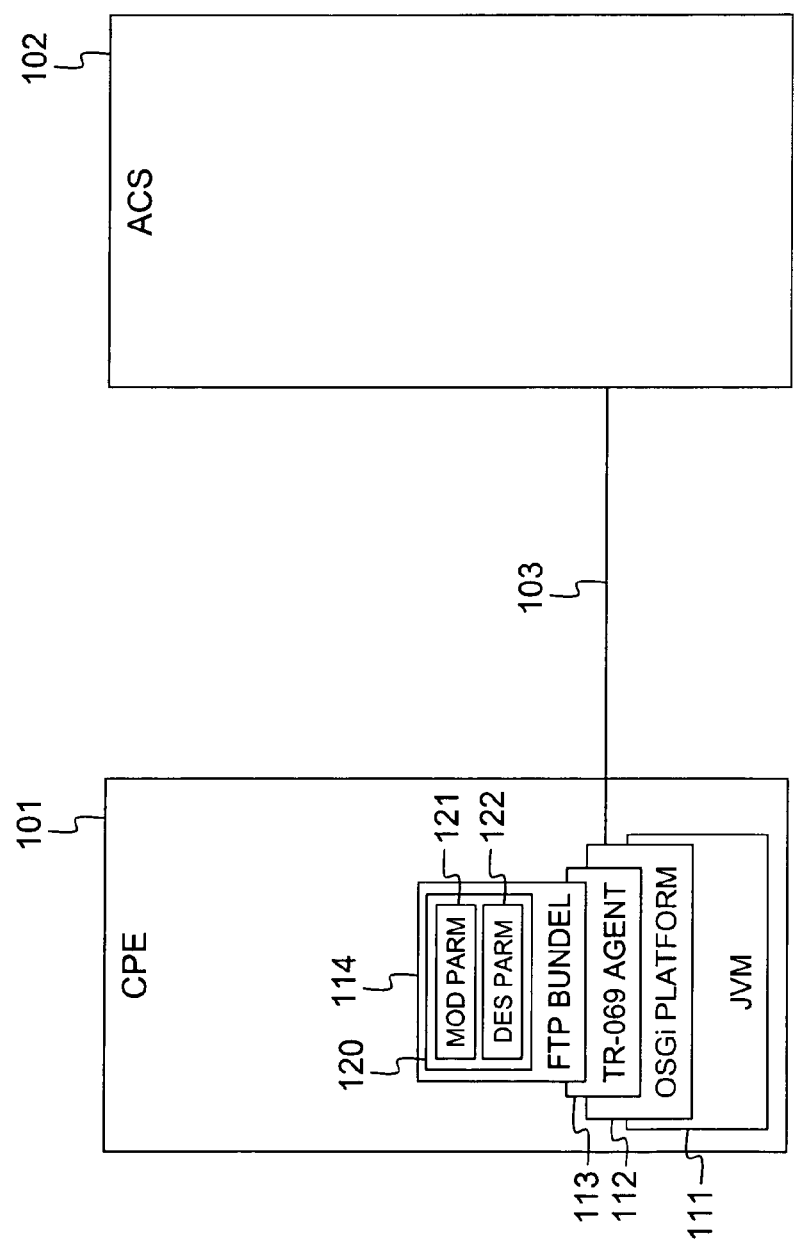
FIG. 1 illustrates a network including an embodiment of the remote management server 102 according to the present invention and a customer device 101 whereon an embodiment of the application module 114 according to the present invention is installed.

FIG. 1 shows a CPE device 101, e.g. an ADSL or VDSL modem, with TR-069 compliant connectivity 103 to an auto configuration server 102 located somewhere in the Internet. The CPE device 101 has an OSGi platform 112 with TR-069 management agent 113 running on top of a Java Virtual Machine 111. FIG. 1 further shows an application module 114, e.g. an FTP client/server software application, that is remotely installed and managed via the TR-069 management agent 113. Upon installation, the software application 114 thereto shares its parameter model 120 with the TR-069 management agent 113. In line with the current invention, this parameter model 120 contains model parameters 121 and description parameters 122. The description parameters 122 constitute a formal TR-069 description model to describe the TR-069 model parameters 121, as will be explained in the following paragraphs.

The TR-069 parameter model 120 for the FTP application 113, drawn in detail in FIG. 2, contains three model parameters and a formal description of the three model parameter. The formal description takes the form of three additional parameters respectively describing the name, type and definition for each of the model parameters.

The three model parameters of the FTP application 113 are named:

InternetGatewayDevice.service.FTP.url
InternetGatewayDevice.service.FTP.login
InternetGatewayDevice.service.FTP.password The first parameter, InternetGatewayDevice.service.FTP.url, contains a URL that designates a file or a directory on an Internet host accessible using the FTP application. The syntax of such FTP URL is described in IETF RFC 959. The second parameter, InternetGatewayDevice.service.FTP.login, contains the login name or username that will be used by the FTP application to access the Internet host, and the third parameter, InternetGatewayDevice. service.FTP.password, contains the password needed to access the Internet host. In the specific example of FIG. 2, these three parameters have at installation of the FTP application as initial values the respective strings "FTP://host.dom/", "myname", and "mypassword".

In addition, the parameter model 113 contains for each of the above model parameter three description parameters with predefined names, recognizable by the auto configuration server 102 when a parameter audit is conducted. The predefined names of the three description parameters are:

InternetGatewayDevice.Dynamic.Parameter.{i}.Name
InternetGatewayDevice.Dynamic.Parameter.{i}.Type
InternetGatewayDevice.Dynamic.Parameter.{i}.Definition Herein, {i} represents the index of the model parameter whereto the description parameter corresponds. In the above example, it may for instance be assumed that the index of the first model parameter, InternetGatewayDevice.service.FTP.url, is 1, the index of the second parameter, InternetGatewayDevice.service.FTP.login, is 2, and the index of the third parameter, InternetGatewayDevice.service.FTP.password, is 3. The first one of the three description parameters formally describes the name of the new model parameter to be created, the second one of the three description parameters formally describes the type of the new model parameter to be created, and the third one of the three description parameters formally defines the new model parameter in human language.

For the three model parameters of the FTP application 114:

InternetGatewayDevice.Service.FTP.url
InternetGatewayDevice.Service.FTP.login
InternetGatewayDevice.Service.FTP.password the bundle 114 thus also implements the following 9 description parameters:

InternetGatewayDevice.Dynamic.Parameter.1.Name with the value: "InternetGatewayDevice.Service.FTP.url";
InternetGatewayDevice.Dynamic.Parameter.1.Type with the value: "String";
InternetGatewayDevice.Dynamic.Parameter.1.Definition with the value: "URL designating the file or directory on an Internet host accessible using the FTP application.";
InternetGatewayDevice.Dynamic.Parameter.2.Name with the value: "InternetGatewayDevice.Service.FTP.login";
InternetGatewayDevice.Dynamic.Parameter.2.Type with the value: "String";
InternetGatewayDevice.Dynamic.Parameter.2.Definition with the value: "Login name used by the FTP application to access the Internet host.";
InternetGatewayDevice.Dynamic.Parameter.3.Name with the value: "InternetGatewayDevice.Service.FTP.password";
InternetGatewayDevice.Dynamic.Parameter.3.Type with the value: "String"; and
InternetGatewayDevice.Dynamic.Parameter.3.Definition with the value: "User name used by the FTP application to access the Internet host.".

When the FTP bundle 114 is downloaded and installed at CPE device 101, the bundle 114 registers his TR-069 parameters with the TR-069 management agent 113. In other words, when the FTP-bundle 114 is downloaded and installed on the OSGi platform 112 inside CPE device 101, the entire TR-069 parameter model 120 is made knowledgeable to the TR-069 management agent 113. The latter agent 113 is thus informed that the following TR-069 parameters are supported by the newly installed application 114:

InternetGatewayDevice.service.FTP.url
InternetGatewayDevice.service.FTP.login
InternetGatewayDevice.service.FTP.password InternetGatewayDevice.Dynamic.Parameter.1.Name
InternetGatewayDevice.Dynamic.Parameter.1.Type
InternetGatewayDevice.Dynamic.Parameter.1.Definition
InternetGatewayDevice.Dynamic.Parameter.2.Name
InternetGatewayDevice.Dynamic.Parameter.2.Type
InternetGatewayDevice.Dynamic.Parameter.2.Definition
InternetGatewayDevice.Dynamic.Parameter.3.Name
InternetGatewayDevice.Dynamic.Parameter.3.Type
InternetGatewayDevice.Dynamic.Parameter.3.Definition When an audit is performed by the auto configuration server 102 on the TR-069 management client 113, e.g. by issuing the TR-069 GetParameterValues instruction, the auto configuration server 102 will automatically receive all necessary data to create/parse/store and handle the three new model parameters. Indeed, upon receipt of the first model parameter, InternetGatewayDevice.service.FTP.url, the auto configuration server 102 will not recognize the new model parameter and therefore decide to memorize the received information. Upon recognition of the predefined parameter name of the first description parameter, InternetGatewayDevice.Dynamic.Parameter.1.Name, the auto configuration server 102 knows that the following information includes the name of the newly defined parameter and learns this information. Similarly, upon recognition of the predefined parameter name InternetGatewayDevice.Dynamic.Parameter.1.Type the auto configuration server 102 knows that the following information includes the type of the newly defined parameter and learns this information. Lastly, upon recognition of the predefined parameter name InternetGatewayDevice.Dynamic.Parameter.1.Definition, the auto configuration server 102 knows that the following information includes the definition in human language of the newly defined parameter and learns this information. With the information learned from the values of these three description parameters, the auto configuration server shall then create and parse the new model parameter InternetGatewayDevice.service.FTP.url.

In a similar way as described in the preceding paragraph, the auto configuration server 102 shall automatically learn the information it needs to create the second new model parameter InternetGatewayDevice.service.FTP.login and the third new model parameter InternetGatewayDevice.service.FTP.password.

Thanks to the presence of the description parameters 122 in the parameter model 120 and the intelligence in the auto configuration server 102 to recognize these description parameters and trigger creation of the model parameters using the information learned from the description parameters, no manual upload of any parameter description to the auto configuration server 102 is needed. Consequently, editing of any XML parameter model description file is avoided.

Since the description parameters are automatically transferred in response to a parameter audit of the auto-configuration server 102, no additional upload is needed as a result of which the performance of the remote management is not impacted. The current invention further is advantageous in that no additional memory is consumed at the client side and in that no new field needs to be predefined in the TR-069 protocol to communicate the new bundle information, i.e. the description parameters, from the northbound interface of the CPE device 101 to the southbound interface of the auto confguration server 102.

Although the present invention has been illustrated by reference to specific embodiments, it will be apparent to those skilled in the art that the invention is not limited to the details of the foregoing illustrative embodiment(s), and that the present invention may be embodied with various changes and modifications without departing from the spirit and scope thereof. For instance, the application model can be any service software component or package such as for instance Http Services, Log, Configuration Management, Preferences, XML Parsing, Device Access, Package Admin, Permission Admin, Start Level, User Admin, IO Connector, Wire Admin, Jini, UPnP Exporter, Application Tracking, Signed Bundles, Declarative Services, Power Management, Device Management, Security Policies, Diagnostic/Monitoring, Framework Layering, etc. The invention is not restricted to a particular number or constitution of description parameters, and is not limited to be used in conjunction with a particular remote management framework such as OSGi and/or remote management protocol such as TR-069. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the spirit and scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A customer device configured to allow remote installation of an application module and to be remotely configured from a remote management server, said customer device comprising:
   a processor and a memory including said application module, said application module having a parameter model including at least one description parameter and an associated model parameter, said at least one description parameter configured to formally describe said associated model parameter with a specificity capable of creating said associated model parameter;
   a remote management client configured to automatically transmit said parameter model to said remote management server via a single message using a remote management protocol to trigger said remote management server to create the associated model parameter, if said remote management server sends an audit request to said customer device;
   wherein the remote management protocol is a TR069 protocol.

2. The customer device according to claim 1, wherein said at least one description parameter includes at least one read-only parameter.

3. The customer device according to claim 1, wherein said at least one description parameter includes a trigger in their name to trigger the creation of said at least one model parameter at said remote management server.

4. The customer device according to claim 3, wherein said trigger includes the word "Dynamic".

5. The customer device according to claim 1, wherein said at least one description parameter comprises a name parameter to formally describe the name of said at least one model parameter.

6. The customer device according to claim 1, wherein said at least one description parameter comprises a type parameter to formally describe the type of said at least one model parameter.

7. The customer device according to claim 1, wherein said at least one description parameter comprises a definition parameter to formally define said at least one model parameter in a human language.

8. A remote management server adapted to remotely install and configure an application module on a customer device, said remote management server comprising:
 a receiver configured to receive a single message from said application module via a remote management protocol, said single message including a parameter model with at least one description parameter and an associated model parameter, said description parameter configured to formally describe said associated model parameter; and
 a processor configured to trigger upon receipt of said at least one description parameter, creation of said associated model parameter at said remote management server using only information within said at least one description parameter;
 wherein the remote management protocol is a TR069 protocol.

9. An application module embedded in a non-transitory computer readable storage medium, the application module being adapted to be remotely installed on a customer device and to be remotely configured from a remote management server, the application module comprising:
 a parameter model with at least one model parameter configured to be communicated automatically, via a remote management protocol, between a remote management client residing in said customer device and said remote management server, the remote management protocol being a TR069 management protocol, the remote management client including a TR069 management agent running on top of a Java Virtual Machine and the parameter model being a TR069 parameter model; and
 at least one description parameter adapted to,
  formally describe the at least one model parameter, and
  trigger automatic creation of the at least one model parameter at the remote management server.

10. The application module according to claim 9, wherein the at least one description parameter comprises:
 at least one read-only parameter.

11. The application module according to claim 9, wherein the at least one description parameter comprises:
 a trigger in a name thereof configured to trigger the automatic creation of the at least one model parameter at said remote management server.

12. The application module according to claim 11, wherein said trigger includes the word "Dynamic".

13. The application module according to claim 9, wherein the at least one description parameter comprises:
 a name parameter configured to formally describe the name of said at least one model parameter.

14. The application module according to claim 9, wherein the at least one description parameter comprises:
 a type parameter configured to formally describe the type of said at least one model parameter.

15. The application module according to claim 9, wherein the at least one description parameter comprises:
 a definition parameter to formally define said at least one model parameter in a human language.

16. A remote management server adapted remotely install and configure an application module on a customer device, the customer device including a remote management client, said remote management server comprising:
 a receiver configured to,
  receive, via a remote management protocol, a parameter model with at least one model parameter from said application module, the remote management protocol being the TR069 remote management protocol, the remote management client including a TR069 management agent running on top of a Java Virtual Machine and the parameter model being a TR069 parameter model, and
  automatically receive at least one description parameter adapted to formally describe said at least one model parameter; and
 a processor configured to automatically trigger creation of said at least one model parameter at said remote management server using said at least one description parameter.

* * * * *